Oct. 28, 1941.  A. ENDERUD  2,260,661

GRAIN INDICATOR

Filed Sept. 5, 1939

INVENTOR
ALBERT ENDERUD
BY
ATTORNEY

Patented Oct. 28, 1941

2,260,661

UNITED STATES PATENT OFFICE 2,260,661

GRAIN INDICATOR

Albert Enderud, Caldwell, Kans.

Application September 5, 1939, Serial No. 293,378

1 Claim. (Cl. 73—317)

This invention relates generally to seed planting apparatus and, more particularly, to a certain new and useful improvement in gauge mechanism for indicating the level of seed grain in the planting apparatus.

All seed planting apparatus and machines, so far as I am aware, are equipped with some form of reservoir or seed-box which requires frequent replenishing during a planting operation, and although, for successful farming, it is extremely desirable for the planter to know from time to time the quantity of seed being planted by the machine and the quantity of seed remaining in the reservoir, so far as I am aware, all planting machines have heretofore, no doubt by reason of the peculiar nature and physical characteristics of seed grain, been devoid of an indicator which would achieve the long desired result.

My invention hence has for its primary objects the provision of a simple, economical, durable, and efficient seed-grain indicator, which is readily adaptable to conventional seed boxes or reservoirs of substantially any shape and size, which is extremely accurate and precise, and which, when installed upon the planting machine, presents a level indication within the full vision of, and easily read by, the operator at all times.

And with the above and other objects in view, my invention resides in the novel features of form, construction, arrangement, and combination of parts presently described and pointed out in the claim.

In the accompanying drawing (1 sheet)—

Figures 1, 2:
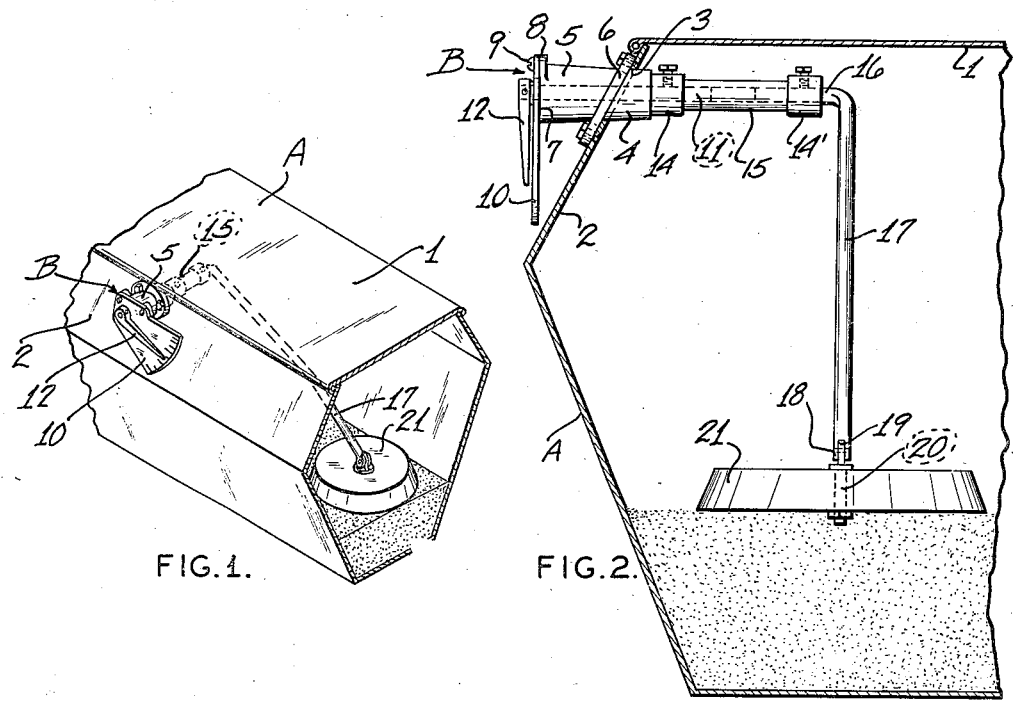
Figure 1 is a reduced fragmentary perspective view of a seed-box equipped with a seed-level-indicator constructed in accordance with and embodying my present invention.
Figure 2 is an enlarged transverse sectional view of the seed-box, illustrating the installed seed-level-indicator substantially in side elevation.

Referring now in more detail and by reference characters to the drawing, which illustrates a preferred embodiment of my present invention, A designates a seed-box or reservoir of any conventional type or design, here shown as including a hinged top wall or lid 1 and an oblique upper side-wall section 2 having an opening 3 for accommodating a tubular shank 4 of a main casting 5 of a seed-level indicator B of my invention, the casting 5 having an oblique annular flange 6 resting upon, and by which the casting 5 is conveniently bolted or otherwise secured to, the side-wall section 2.

At its outer end, the casting 5 is provided with a smoothly machined transverse end face 7 and a plurality of radially outwardly presented apertured and threaded ears 8 for receiving headed-screws 9 suitably engaging an indicator scale plate 10 for firmly securing the plate 10 flatwise upon the casting end-face 7, all as best seen in Figure 2 and for purposes presently fully appearing.

The casting 5 and plate 10 have a continuous bore for rotatably accommodating a shaft 11, fixed on the outer end of which is pointer or indicator arm 12 adapted to swingably move across a suitable scale or graduations 13 etched or otherwise imprinted or disposed upon the outer visible face of the plate 10.

Figure 3:
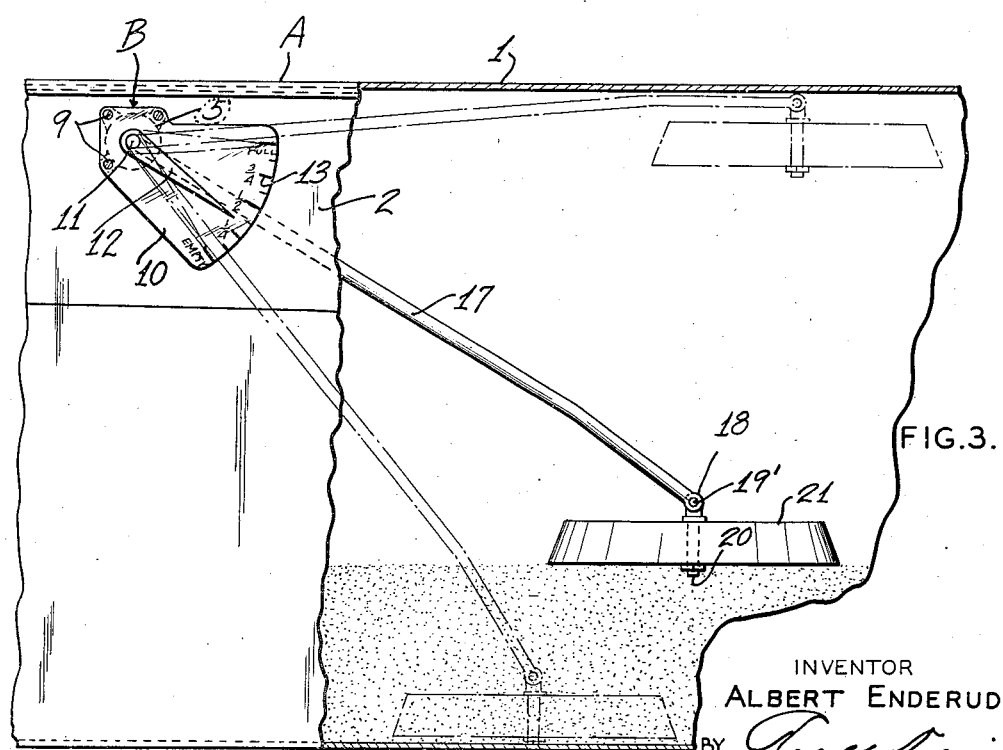
Figure 3 is a further enlarged fragmentary longitudinal sectional view of the seed-box, illustrating the installed seed-level-indicator substantially in front elevation.

Fixed at an end, as by means of a set-collar or the like 14, upon the inner end of the shaft 11, is a connection-tube 15, and fixed to and upon the opposite end of tube 15, as by means of a second set-collar or the like 14', is the laterally presented horizontal end-portion 16 of a suitably elongated arm or link 17 presented downwardly within the box A and, in turn, provided at its free end with a bifurcation or yoke 18, to which is pivotally secured, as by a pintle 19', an eye 19 of a hanger-bolt 20 operatively mounted in and extending axially through a relatively large frusto-conically shaped aluminum rider or so-called float 21 adapted to freely rest upon the top of the contained grain or seed and rotatably or swingably actuate the indicator shaft 11 and pointer 12 over or relatively to the scale 13 for visually indicating the grain or seed level within the box A, as best seen in Figure 3.

It will be obvious that the rider or so-called float 21 does not, of course, float upon the contained seed or grain in the usual or accurate sense of the term, for the member 21 is actually relatively heavy, but nevertheless the member 21 rests freely upon the contained grain or seed and is of such relative dimensions, weight, and specific gravity as to extend over such an area of the grain or seed as to move up or down with the contained grain or seed as the quantity or volume thereof varies, that is to say, is reduced by consumption or increased by replenishment, and as not to be materially affected by any sidewise shifting or bumping up and down of the contained grain or seed due to the movement of the planting machine over the relatively rough ground of the field or farm.

The indicator is relatively simple in construction, may be readily and inexpensively installed for use with standard seed or grain boxes, and has been found precise and efficient in the performance of its intended functions.

It should be understood that changes and modifications in the form, construction, arrangement, and combination of the several parts of the indicator may be made and substituted for those herein shown and described without departing from the nature and principle of my invention.

Having thus described my invention, what I claim and desire to secure by Letters Patent is:

A seed-box grain-level indicator comprising graduations mounted exteriorly of the box, a shaft having a bearing in a wall of the box for rotatory movement, a pointer fixed on the shaft for movement over and relatively to the graduations, and actuating means operably connected to the shaft and including a swingably mounted frusto-conical member having a density less than that of the grain and resting freely on the contained grain for swinging the pointer responsive to variation in the level of the grain in the seed box.

ALBERT ENDERUD.